United States Patent [19]
Wakabayashi

[11] Patent Number: 5,022,503
[45] Date of Patent: Jun. 11, 1991

[54] ELECTRICALLY ACTUATED WHEEL HUB CLUTCH APPARATUS

[75] Inventor: Hideaki Wakabayashi, Nagoya, Japan

[73] Assignee: Aisin Seiki Kabushiki Kaisha, Kariya, Japan

[21] Appl. No.: 381,947

[22] Filed: Jul. 19, 1989

[30] Foreign Application Priority Data

Jul. 29, 1988 [JP] Japan ............................ 63-099770[U]

[51] Int. Cl.$^5$ ............................................. B60K 23/08
[52] U.S. Cl. ................................. 192/0.02 R; 192/50; 192/84 R; 310/242
[58] Field of Search ............... 192/0.02 R, 35, 40, 192/49, 50, 67 R, 84 R, 93 A; 403/1; 180/247; 310/143, 148, 232, 239, 242, 245, 248

[56] References Cited

U.S. PATENT DOCUMENTS

| | | | |
|---|---|---|---|
| 682,898 | 9/1901 | Anderson | 310/143 X |
| 3,123,169 | 3/1964 | Young et al. | 192/40 X |
| 4,534,455 | 8/1985 | Fujikawa | 192/40 |
| 4,694,943 | 9/1987 | Petrak | 192/35 |
| 4,776,441 | 10/1988 | Kagata et al. | 192/0.02 R |

*Primary Examiner*—Richard Lorence
*Attorney, Agent, or Firm*—Burns, Doane, Swecker & Mathis

[57] ABSTRACT

An electrically actuated wheel hub clutch includes a clutch device. The clutch device alternately engages and disengages a wheel hub relative to an axle shaft. An electric motor actuates the clutch device. An electric circuit delivers electric current to the motor. The circuit includes a brush and a radially aligned slip ring arranged for relative rotation about an axis. The brush and slip ring are carried by respective holders. The brush holder includes at least one radial projection overlapping both the brush and slip ring to prevent relative axial disengagement therebetween.

14 Claims, 5 Drawing Sheets

5,022,503

ELECTRICALLY ACTUATED WHEEL HUB CLUTCH APPARATUS

BACKGROUND OF THE INVENTION

1. Field of the Invention

This invention relates to an electrically actuated wheel hub clutch apparatus and more particularly to an electrically actuated wheel hub clutch apparatus for automobiles and other types of machines.

2. Description of the Related Art

A conventional electric wheel hub clutch apparatus is disclosed in Japanese Utility Model Laid Open Publication No. 63(1988)-52626 published without examination on Apr. 8, 1988. The clutch is adapted to convert from two-wheel drive to fourwheel drive by turning a switch. That clutch is shown in FIG. 5, herein where a wheel hub 19' is rotatably assembled on an outer peripheral surface of a stationary axle tube 14' by means of bearings 30', 31'. A cylindrical body 1' is fixed to a cover 2' by a bolt 3'. A ring 4' is fixed to an inside portion of the cylindrical body 1' by a plate 9' and a snap ring 5'. An inner sleeve 6' which is rotated together with an axial shaft 8' is engaged with the snap ring 5a' and is rotatably supported by the ring 4'. A cam surface 12b' is formed on the outer peripheral surface of a boss 12a' of a handle 12'.

A clutch member 7' is in contact with a cam follower 10' assembled in the boss 12a'. The outer peripheral surface of the clutch member 7' and the inner peripheral surface of the cylindrical body 1' are axially and slidably attached by a spline-connection. A tension spring 13' is provided between the clutch member 7' and the cam follower 10' and a tension spring 11' is provided between the handle 12' and the cam follower 10'. Furthermore, a motor 16' fixed in a lateral wall of the cylindrical body 1' has a shaft 16a' and a pinion gear 15' fixedly connected to a free end portion of the shaft member 16a'. Gear teeth 12c' are provided on the outer peripheral surface of the handle 12' so as to engage with the pinion gear 15'.

A lock plate 32' is in spline-connection with the axle tube 14' and a lock nut 33' is connected to the lock plate 32' by means of a bolt 34'. A pair of slip rings 35' are assembled on the outer periphery of the lock nut 32'. An electric cord 36' is inserted in a throughhole 14a' formed in the axle tube 14'. One end of the electric cord 36' is connected to a terminal of the slip ring 35', and other end of the electric cord 36' is connected to a control box (not shown), an electric source (not shown), and a switch of a driver's seat in the automotive vehicle. A brush case 37' is fixed to the wheel hub 19', and a pair of springs 38' are accommodated in the brush case 37'. A pair of brushes 39' are connected to ends of the springs 38' and are biased against the slip rings 35'. A convex terminal 16b' of the motor 16' is fixedly connected to a concave terminal 40' attached to other end of the springs 38'.

In operation, assume that the clutch member 7' is disengaged from the inner sleeve 6' as shown in FIG. 5. After the switch (not shown) is turned on, electric current flows to the motor 16' through the slip rings 35', and the shaft 16a' is rotated in one direction. The handle 12' engaged with the pinion gear 15' is rotated into the one direction, and a pawl 10a' of the cam follower 10' is leftwardly cammed by a cam surface 12b' of the handle 12'. Accordingly, the clutch member 7' is leftwardly moved and is engaged with the inner sleeve 6' via splines 6a', 7a'. The axle shaft 8' is thereby connected to the wheel hub 19' to perform the four-wheel drive function.

In the above-mentioned conventional free wheel hub apparatus, the lock plate 32' having the slip rings 35' is in spline-connection with the axle tube 14'. The brush case 37' having the brushes 39' contacted with the slip rings 35' is assembled in the wheel hub 19'. Thus, the lock plate 32' and the brush case 37' are separately provided so that the brushes 39' are influenced by the vibration of the condition of road surface through the wheel hub 19' and a wheel of the vehicle. Accordingly, there is the possibility that the brushes 39' may become shifted away from the contacting surface of the slip rings 35'. Furthermore, it is difficult to adjust the brushes 39' to the slip rings 35' upon assembling the brush case 37' and the slip rings 35', so that there is the possibility that the brushes 39' and the slip rings 35' become abnormally worn. As a result, there is a fear that the ability to transmit electric current is impaired due to the bad condition of the environment such as vibration and the presence of foreign materials, etc.

OBJECTS AND SUMMARY OF THE PRESENT INVENTION

It is an object of the present invention to provide an electrically actuated wheel hub clutch apparatus wherein it is easy to adjust the brush and the slip ring upon assembling the brush case and the slip ring.

It is another object of the present invention to provide an electrically actuated wheel hub clutch apparatus which minimizes the occurrence of wear between the brush case and the slip ring.

It is still another object of the present invention to provide an electrically actuated wheel hub clutch apparatus wherein the ability to transmit electric current is maintained even under bad conditions of the environment such as vibration and the presence of foreign materials, etc.

In order to accomplish the objects, the present invention provides a radial retainer which forms a part of either a brush holder or a slip ring holder and which radially overlaps the brush and its associated slip ring in order to resist axial dislodgement therebetween.

BRIEF DESCRIPTION OF THE DRAWINGS

These and other objects, features and advantages of the present invention will become more apparent on reading the following detailed description with reference to the accompanying drawings, wherein like members bear like reference numerals, and wherein:

FIG. 2 is a longitudinal sectional view similar to FIG. 1 taken along a plane angularly displaced from that along which FIG. 1 is taken;

DETAILED DESCRIPTION OF THE PREFERRED EMBODIMENT

Figure 1:
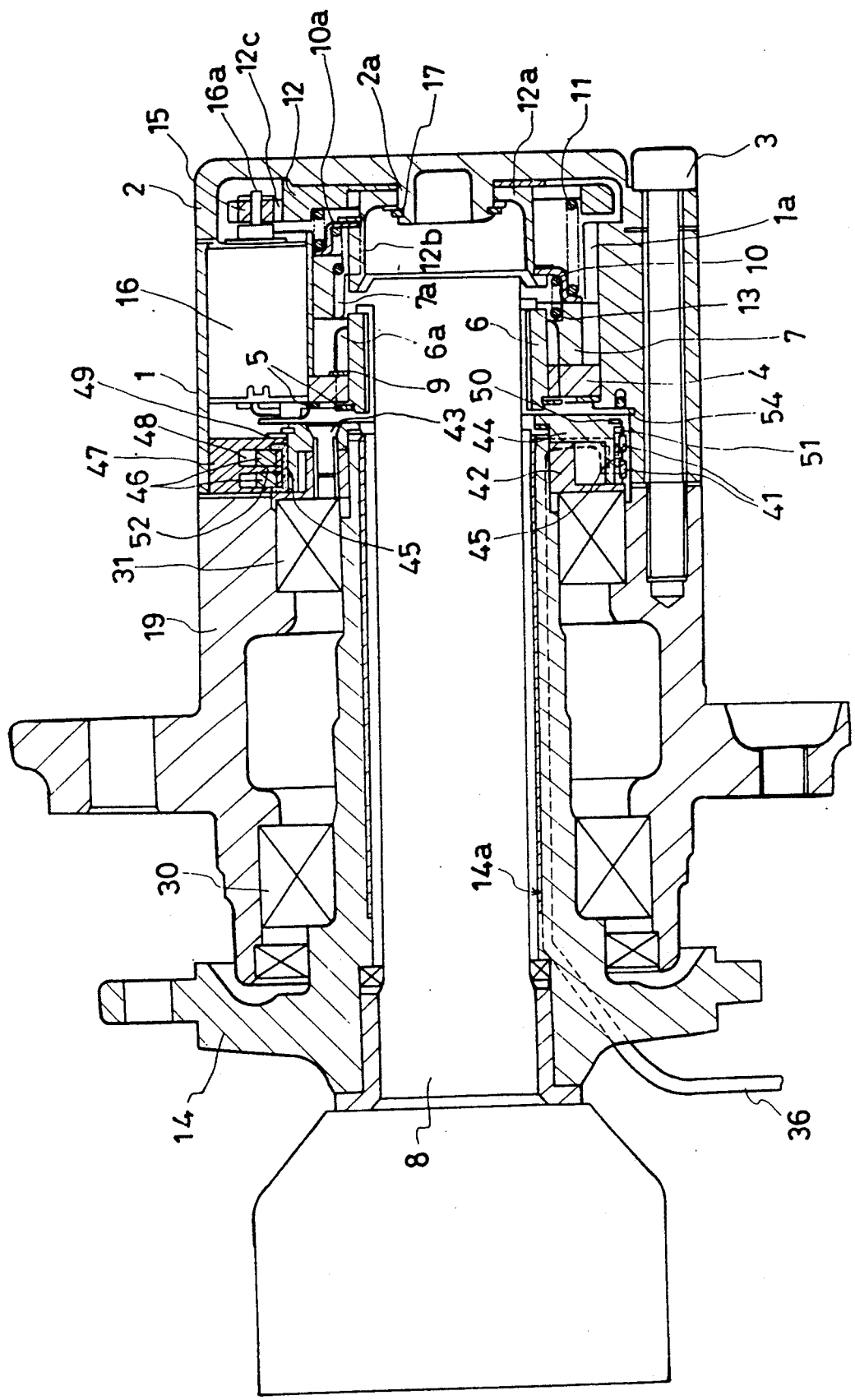
FIG. 1 is a longitudinal sectional view of a wheel hub clutch according to the present invention.
Figure 2:
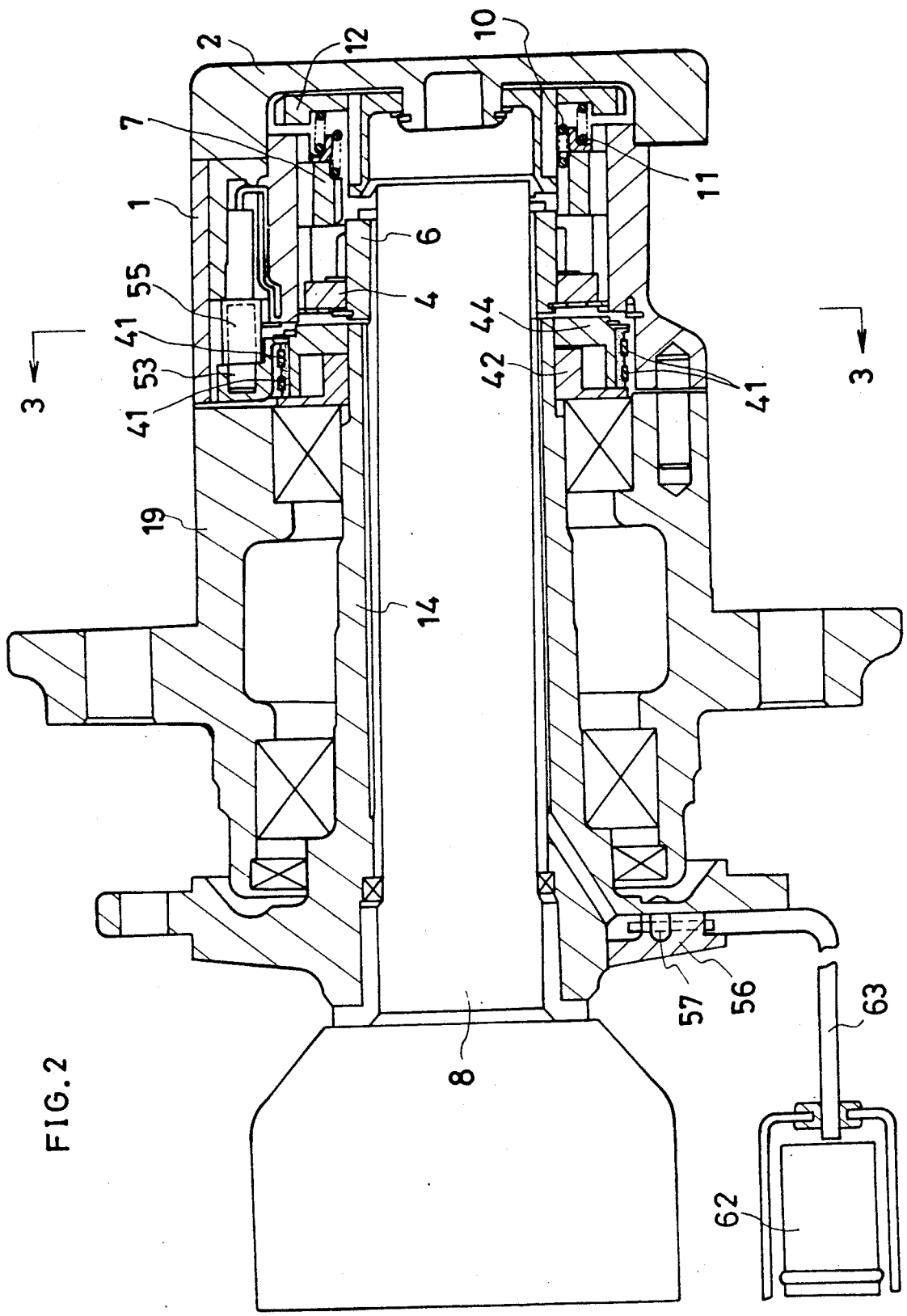

An embodiment of the present invention will hereinafter be described with reference to FIGS. 1 to 4 inclusive. In an electrically actuated wheel hub clutch apparatus according to the present invention, a cylindrical body 1 is fixed by a bolt 3 to an external end of a wheel hub 19 which is rotatably installed on an external end of an axle tube 14.

In the cylindrical body 1, a ring 4 is supportingly interposed between a plate 9 and a pair of snap rings 5, one of which snap rings is held by the cylindrical body 1 and the other of which is supported in the ring 4. The plate 9 is rotatably supported on the outer periphery of an inner sleeve 6 adjacent the ends of a plurality of splines 6a on the sleeve 6. The inner sleeve 6 rotates together with an axle shaft 8 and is rotatably supported by the ring 4. A handle 12 is rotatably supported by a bush 17 fitted to a boss 2a of a cover 2 attached to the cylindrical body 1 by the bolt 3. A cam surface 12b is formed on a circumference of a boss 12a of the handle 12. A cam follower 10 bears against the outer periphery of the boss 12a of the handle 12, with a pawl 10a of the cam follower 10 impinging upon the cam surface 12.

A clutch member 7 is so provided as to impinge upon the cam follower 10. The clutch member 7 is installed so that it is axially slidable between its outer peripheral surface and the inner peripheral surface of the cylindrical body 1 while being prevented from rotating relative to the body 1 by splines 1a on the body inner surface. A tension spring 11 is attached to the cam follower 10 and the handle 12, and a tension spring 13 is attached to the follower 10 and the clutch member 7. Splines 7a, 6a, which are capable of engaging with each other, are provided on the inner peripheral surface of the clutch member 7 and on the outer peripheral surface of the inner sleeve 6, respectively.

A motor 16 including a shaft 16a is installed in the side wall of the body 1. The free end of the shaft 16a is provided with a pinion gear 15. Gear teeth 12c are provided on the outer periphery of the handle 12 so as to mesh with the pinion gear 15. A lock plate 44 and a lock nut 42 are seated against the end surface of the bearing 31 with a view to preventing the bearings 31 from being removed therefrom. The lock nut 42 is screwed to the axle tube 14; the lock plate 44 is spline-joined to the axle tube 14; and they are mutually joined by a bolt 43. A pair of slip rings 41 are fixed to the outer periphery of the lock plate 44 through an insulating member 45, whereby the lock plate forms a slip ring holder. The axle tube 14 is formed with a throughhole 14a in which an electric cord 36 is disposed.

One end of the electric cord 36 is connected to terminals of the slip rings 41 of the lock plate 44, and the other end thereof passes to a control box (not shown) within the car and is then branched off to an electric power source (not shown) and to a switch (not shown) in the proximity of the driver's seat.

A brush holder in the form of a case 47, including an integral wall 47a and plate 51, is axially supported by an arrangement comprising a spacer 49, a connecter 53 and a snap ring 50. The spacer 49 and the snap ring 50 are adjacently disposed and mounted to the lock plate 44. The brush case 47 is rotatable relative to the lock plate 44. The connector 53 is received in a lug 51a of plate 51. A radial inward projection portion 52 provided on the brush case 47 (FIG. 4) extends axially between a pair of brushes 46 disposed in the brush case 47 and between the slip rings 41, so that the brushes 46 may be supported with respect to the slip rings 41 only for rotational movement about the axle shaft 8 while in continuous contact with the slip rings 41. Thus, the projection 52 radially overlaps the brushes and slip rings to prevent axial disengagement therebetween. This function is also performed by the portions 47a, 51 of the brush case 47. Thus, the projection 52 and portions 47a, 51 constitute axial retainers for the brushes and slip rings. Alternatively, radial outward projections (not shown) could be provided on the insulating member 45 and extended radially outwardly for retaining the slip rings 41 and the brushes 46.

Figure 3:
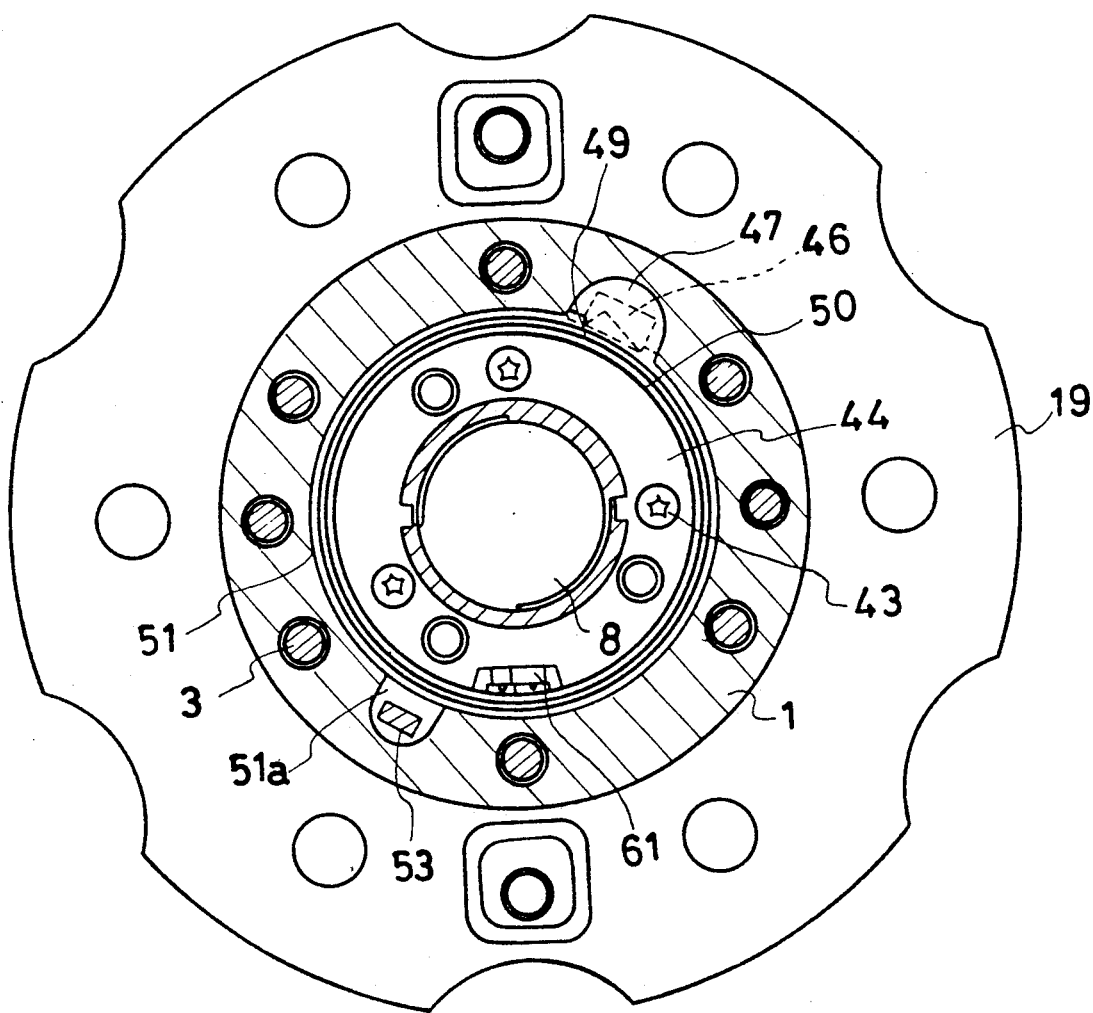
FIG. 3 is a cross sectional view taken along the line 3—3 in FIG. 2.
Figure 4:
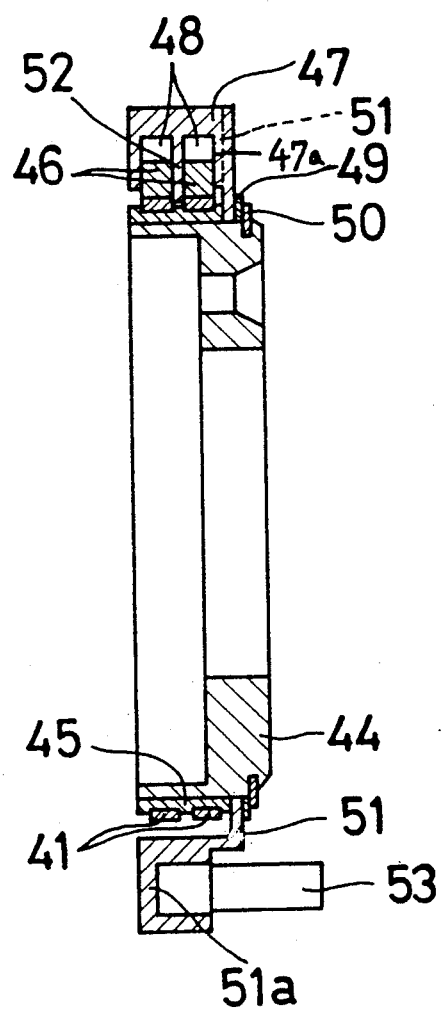
FIG. 4 is a longitudinal sectional view through a brush holder and slip ring holder according to the present invention; and FIG. a longitudinal section view taken through a prior art wheel hub clutch apparatus.
Figure 5:
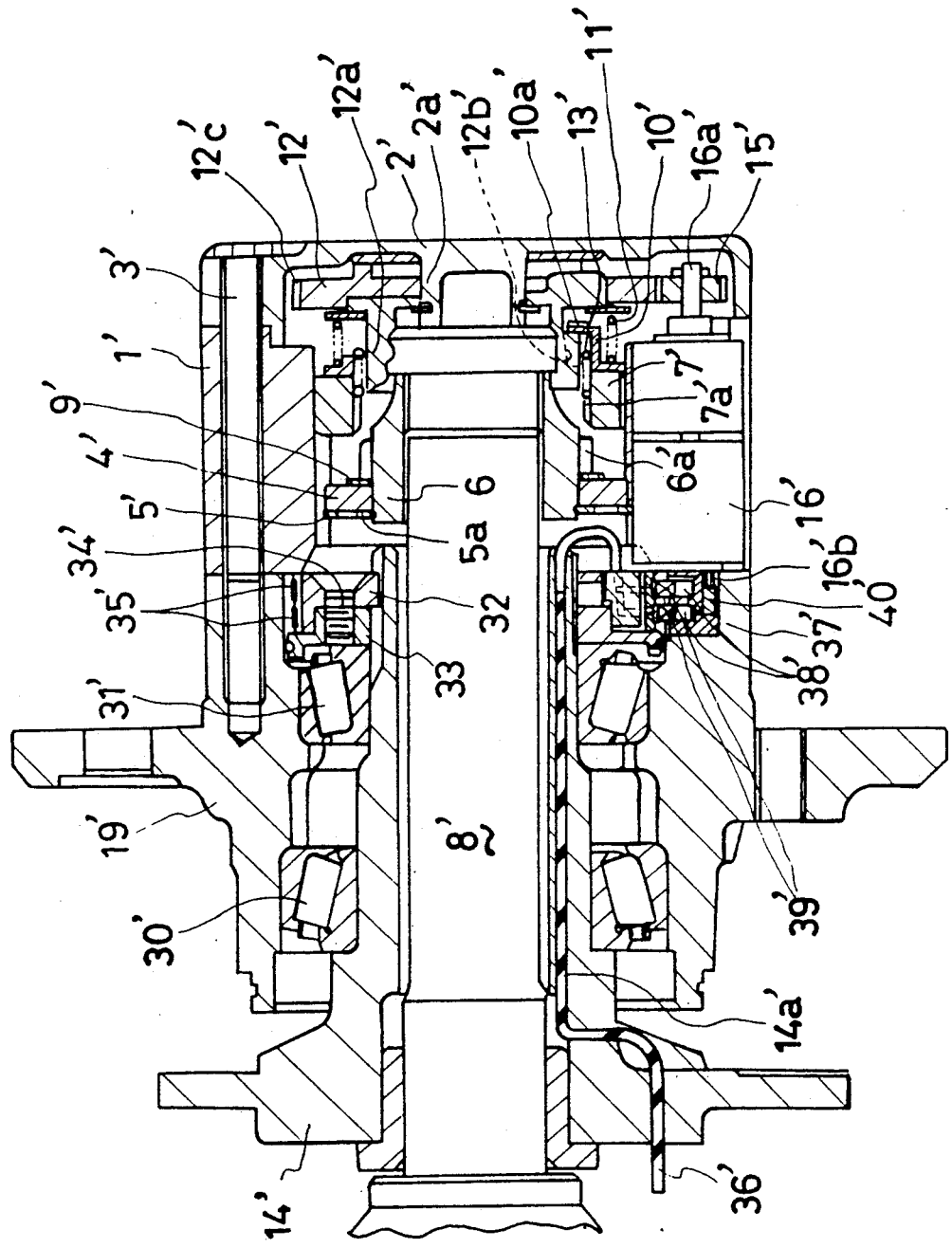

The brushes 46 are fitted to the ends of a pair of springs 48 to be biased against the slip rings 41. Other ends of the springs are connected to the connecter 53 by a flexible printed circuit 61 deposited on the plate 51 (FIG. 3).

A convex terminal of the motor 16 is designed to fit in a concave terminal of the brush case 47 when the cylindrical body 1 is fastened to the wheel hub 19, whereby the circuit extending from the motor 16 to the wheel hub 19 can be created by a one-touch operation.

The operation of the electrically actuated a wheel hub clutch apparatus will be explained below.

When a switch (not shown) is turned on at a time when the clutch member 7 is separated from the inner sleeve 6, (depicted in the upper half of FIG. 1), the motor 16 is charged with electricity through the brushes 46 and slip rings 41. As a result, the shaft 16a rotates in a first direction for a preselected angular distance, and concomitantly the handle 12 engaging the pinion gear 15 rotates in a second direction opposite to the first direction. Subsequently, the pawl 10a of the cam follower 10 is cammed in the axial direction, (i.e., it is shifted to the left as viewed in FIG. 1) by the cam surface 12b of the handle 12. This causes the clutch member 7 to move in the same direction and engage splines 6a of the inner sleeve 6, thereby establishing a four-wheel drive function by linking the axle shaft 8 to the wheel hub 19 as shown in the bottom half of FIG. 1. This movement of the clutch member 7 causes the tension spring 11 to be stretched.

When it is desired that the above-described clutch member 7 be disengaged from the inner sleeve 6, and assuming the vehicle is stopped, the switch (not shown) is turned off, at which time the shaft 16a rotates to its original position and rotates the handle 12 in the direction opposite to the direction of rotation of the shaft 16a. Since the pawl 10a of the cam follower 10 is biased by spring 11 in the axial direction (to the right as viewed in FIG. 1) against the cam surface 12b of the handle 12, the cam follower 10 will be displaced to the right as the handle 12 rotates. However, the clutch member 7 will resist such movement, due to frictional contact with the sleeve 6 and resistance of spring 13. Accordingly, the pawl 10a comes to a stop just when the force of the tension spring 11 is equalized by the counter force of friction and the tension spring 13.

Thereafter, when the vehicle moves, cooperative rotation is made between the axle shaft 8 and the wheel hub 19, thereby producing cooperative rotation between the inner sleeve 6 and the clutch member 7. When this occurs, frictional force between the inner sleeve 6 and the clutch member 7 is reduced to the point where the clutch member 7 can be pulled in the axial direction (to the right in FIG. 1) under the urging of the tension spring 11 to become separated from the inner sleeve 6. Therefore, the two-wheel drive function is eliminated.

It will be appreciated that the part 47a, 51, and the part 52, which parts radially overlap the brushes and slip rings, constitute retainers which prevent relative axial movement of the brushes relative to the slip rings. While those retainers have been depicted as connected to the brush case 47, they could, in the alternative, be connected to the structure holding the slip rings, e.g., the insulation 45. Such retainers also resist the influx of foreign matter such as dust between the brushes and slip rings. Such protection is easy to achieve during assemblage of the clutch apparatus.

The above-described apparatus is only exemplary of a preferred embodiment of the invention. Modifications thereof are possible without departing from the scope of the appended claims.

What is claimed is:

1. An electrically actuated wheel hub clutch apparatus, comprising:
   an axle shaft and a wheel hub mounted for rotation about a common axis, the wheel hub being rotatable relative to the axle shaft about the axis;
   clutch means selectively movable to a first position for selectively interconnecting the wheel hub and the axle shaft for rotation and to a second position for disengaging the wheel hub from the axle shaft for freewheeling rotation about the axis;
   electrically powered means for actuating said clutch means between the first and second positions;
   a slip ring holder containing at least one slip ring;
   a brush holder containing at least one brush arranged in contact with the at least one slip ring for relative rotation therebetween about the axis;
   the slip ring and brush comprising portions of an electric circuit for conducting electric power to the electrically powered means from a location externally of said apparatus; and
   retaining means radially overlapping and extending along at least one side face of the at least one brush and the at least one slip ring for preventing axial disengagement between the at least one slip ring and the at least one brush that results from forces transmitted through the wheel hub.

2. Apparatus according to claim 1 wherein the retaining means is connected to one of the brush holder and slip ring holders.

3. Apparatus according to claim 2 wherein the retaining means is connected to the brush holder.

4. Apparatus according to claim 1 wherein there are a plurality of brushes and a plurality of slip rings, a first brush and a first slip ring being radially aligned, and a second brush and a second slip ring being radially aligned and axially spaced from the first brush and first slip ring, the retaining means disposed axially between the first and second brushes and axially between the first and second slip rings.

5. Apparatus according to claim 4 wherein the retaining means is connected to one of the brush holder and slip ring holders.

6. Apparatus according to claim 5 wherein the retaining means is connected to the brush holder.

7. Apparatus according to claim 6 wherein the brush holder is disposed radially outwardly of the slip ring holder, the retaining means extending in a radially inward direction.

8. Apparatus according to claim 7 wherein electric current flows from the slip ring to the brush and then to the clutch means.

9. An electrically actuated wheel hub clutch apparatus, comprising:
   an axle shaft and a wheel hub mounted for rotation about a common axis, the wheel hub being rotatable relative to the axle shaft about the axis;
   clutch means selectively movable to a first position for selectively interconnecting the wheel hub and the axle shaft for rotation and to a second position for disengaging the wheel hub from the axle shaft for free-wheeling rotation about the axis;
   electrically powered means for actuating said clutch means between the first and second positions;
   a slip ring holder containing at least one slip ring;
   a brush holder containing at least one brush arranged in contact with the at least one slip ring for relative rotation therebetween about the axis;
   supporting means mounted on the slip ring holder for axially supporting and axially retaining the brush holder with respect to the slip ring holder;
   the slip ring and brush comprising portions of an electric circuit for conducting electric power to the electrically powered means from a location externally of said apparatus; and
   retaining means radially overlapping the at least one brush and the at least one slip ring for preventing axial disengagement therebetween.

10. Apparatus according to claim 9, wherein said supporting means includes a snap ring mounted on the slip ring holder and a spacer positioned between the snap ring and the brush holder.

11. Apparatus according to claim 10, wherein the retaining means includes a radially inwardly directed projection portion extending from the brush holder and disposed along one side face of said at least one brush and said at least one slip ring, and a radially inwardly directed integral wall of the brush holder disposed along an opposite side face of said at least one brush and said at least one slip ring.

12. Apparatus according to claim 11, wherein the retaining means also includes a plate positioned adjacent the radially inwardly directed wall of the brush holder, said plate being disposed between the spacer and the radially inwardly directed wall of the brush holder.

13. Apparatus according to claim 1, including a substantially cylindrical body secured to an end of the wheel hub, said brush holder being positioned within the cylindrical body.

14. Apparatus according to claim 9, including a substantially cylindrical body secured to an end of the wheel hub, said brush holder being positioned within the cylindrical body.

* * * * *